No. 670,603. Patented Mar. 26, 1901.
G. N. BARCUS.
HORSESHOEING APPARATUS.
(Application filed Aug. 29, 1900.)
(No Model.) 4 Sheets—Sheet 1.
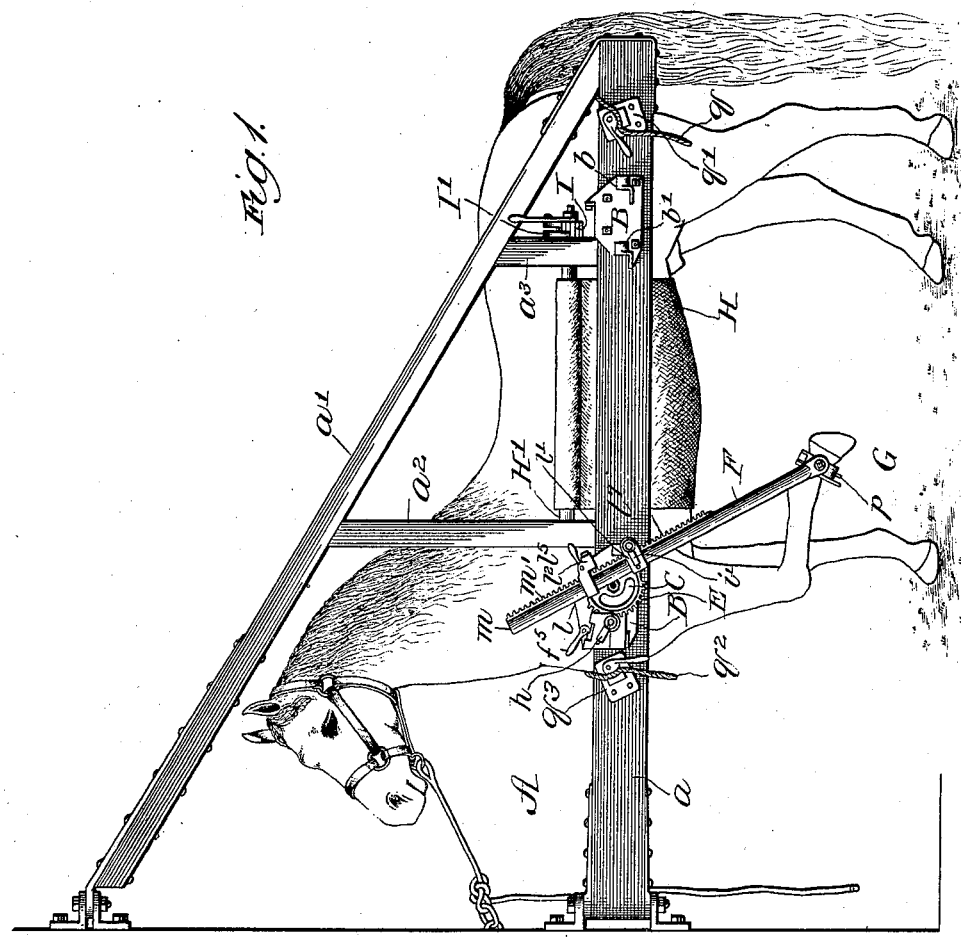
Witnesses:
Chas. L. Gaylord,
John Enders Jr.
Inventor,
George N. Barcus,
By Dyrenforth, Dyrenforth & Lee,
Att'ys No. 670,603. Patented Mar. 26, 1901.
G. N. BARCUS.
HORSESHOEING APPARATUS.
(Application filed Aug. 29, 1900.)
(No Model.) 4 Sheets—Sheet 2.
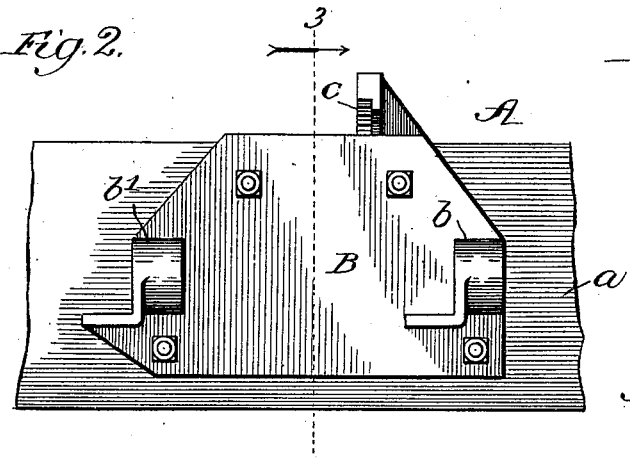
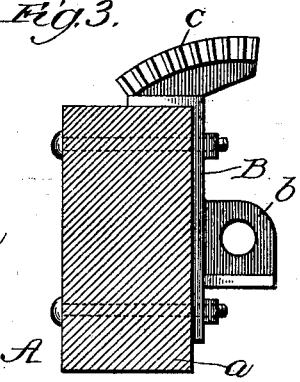
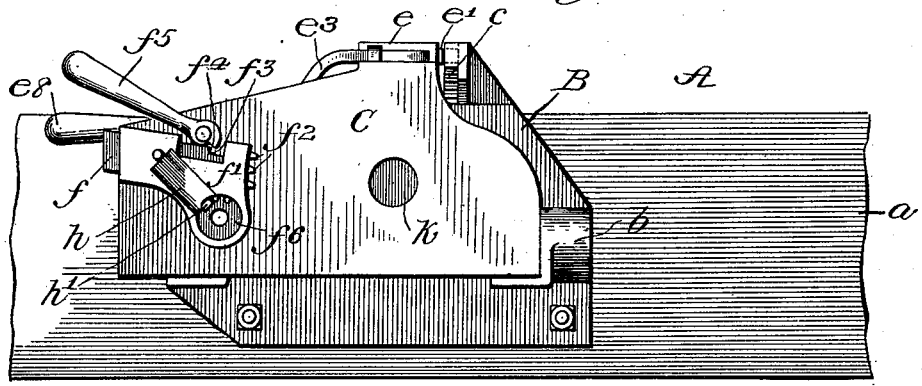
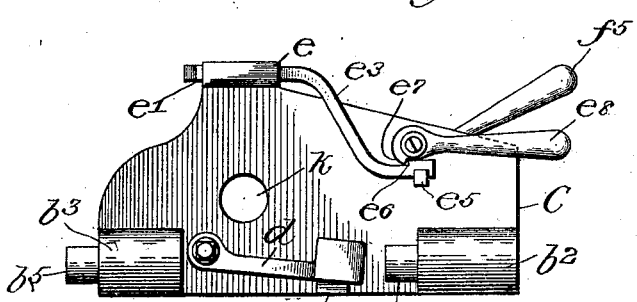
Witnesses:
Inventor:
George N. Barcus, No. 670,603. Patented Mar. 26, 1901.
G. N. BARCUS.
HORSESHOEING APPARATUS.
(Application filed Aug. 29, 1900.)
(No Model.) 4 Sheets—Sheet 3.
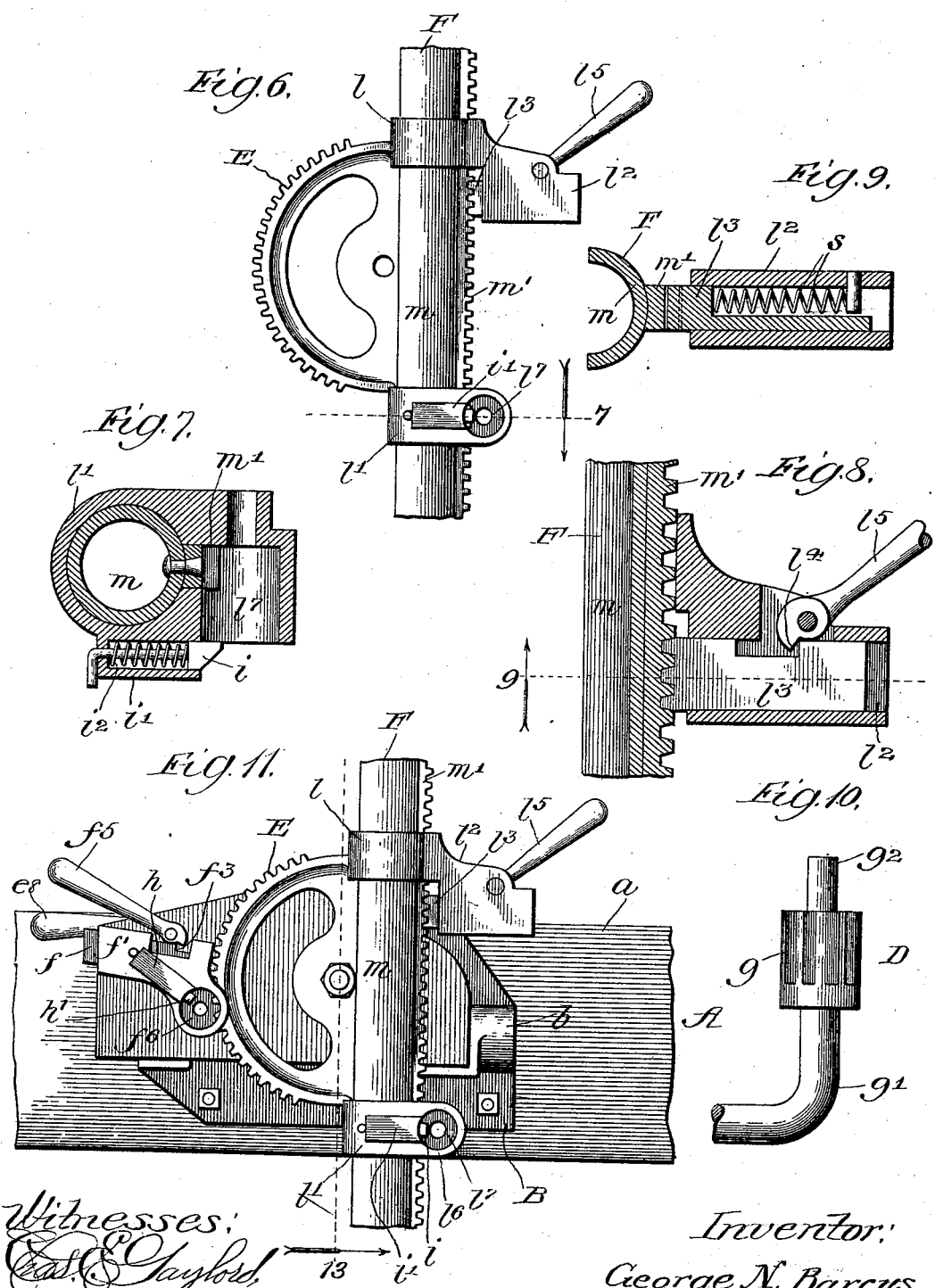

No. 670,603. Patented Mar. 26, 1901.
G. N. BARCUS.
HORSESHOEING APPARATUS.
(Application filed Aug. 29, 1900.)
(No Model.) 4 Sheets—Sheet 4.
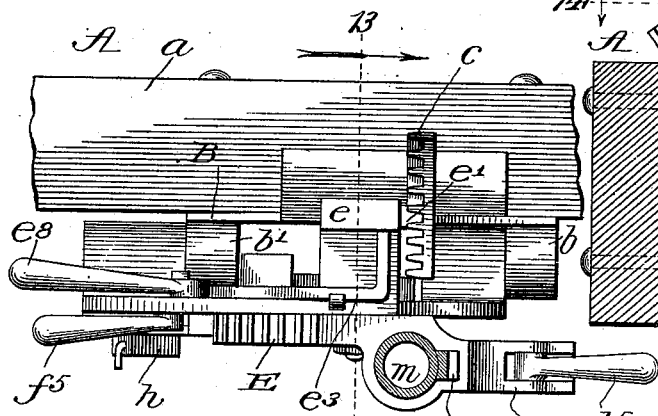
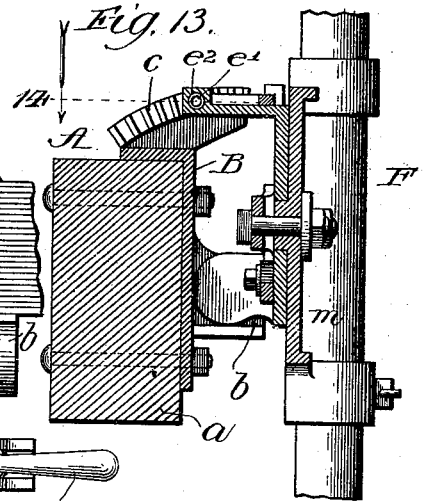
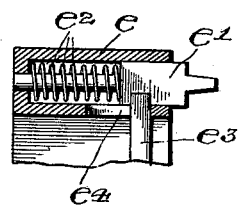
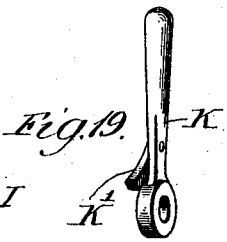
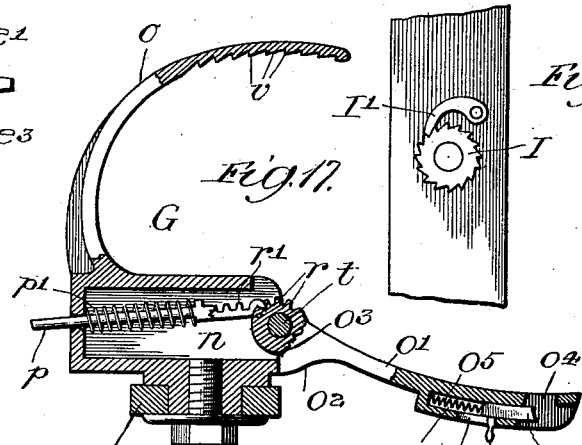
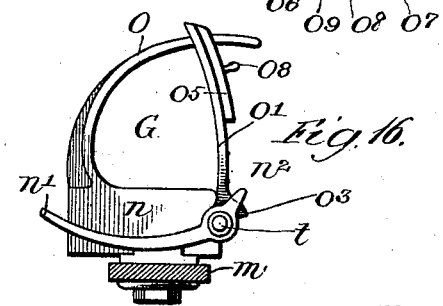
Witnesses:
Chas E Gaylord
John Enders Jr
Inventor:
George N. Barcus,
By Dyrenforth, Dyrenforth & Lee,
Attys.

UNITED STATES PATENT OFFICE.

GEORGE N. BARCUS, OF RENSSELAER, INDIANA.

HORSESHOEING APPARATUS.

SPECIFICATION forming part of Letters Patent No. 670,603, dated March 26, 1901.

Application filed August 29, 1900. Serial No. 28,453. (No model.)

*To all whom it may concern:*

Be it known that I, GEORGE N. BARCUS, a citizen of the United States, residing at Rensselaer, in the county of Jasper and State of Indiana, have invented a new and useful Improvement in Horseshoeing Apparatus, of which the following is a specification.

My invention relates to an improvement in apparatus for securing a horse, more especially while being shod; and it relates particularly to an improvement in the class of such apparatus involving an adjustable stall for confining the animal, formed with two laterally-swinging side frames equipped with mechanism through the medium of which to manipulate the animal's leg for the purpose of adjusting the hoof being operated on into and holding it in different positions conveniently accessible to the operator. Such apparatus is shown and described in my Patent No. 590,800, dated September 28, 1897; and my more immediate object is to improve upon the mechanism thereof, primarily to the ends of simplifying it and adapting it to produce by more convenient manipulation and in more desirable ways various adjustments of the animal's leg and to improve the automatic action of the clamp which is caused to encircle the ankle portion of the leg for connecting it with the adjusting mechanism.

Referring to the accompanying drawings, Figure 1 shows my improved apparatus by a view in side elevation as applied to a horse in position to be controlled by it. Fig. 2 shows in side elevation one of the supporting-plates for the leg-adjusting mechanism, of which plates one should be provided permanently attached to each frame of the stall near each of its opposite ends. Fig. 3 is a section taken at the line 3 on Fig. 2 and viewed in the direction of the arrow; Fig. 4, a view like that presented by Fig. 2, but showing the removable and adjustable bearing-plate for the leg-adjusting mechanism in its operative position on a supporting-plate; Fig. 5, a view in side elevation of the bearing-plate, presenting its inner face or that on the side opposite the one presented in Fig. 4; Fig. 6, a broken view in elevation of the longitudinally-adjustable rack member of the adjusting mechanism on a rotatable segmental rack which is journaled on the bearing-plate; Fig. 7, a section taken at the line 7 on Fig. 6 and viewed in the direction of the arrow; Fig. 8, a broken view of an enlarged vertical section through the rack and locking-bolt portions of the mechanism presented in Fig. 6; Fig. 9, a section taken at the line 9 on Fig. 8 and viewed in the direction of the arrow; Fig. 10, a broken view of a key through the medium of which to actuate different parts of the mechanism; Fig. 11, a broken view showing all the parts together of the adjusting mechanism carried by a supporting-plate; Fig. 12, a top plan view of the same with the rack in section; Fig. 13, a section taken at the line 13 on Fig. 12 and viewed in the direction of the arrow; Fig. 14, a section taken at the line 14 on Fig. 13 and viewed in the direction of the arrow; Fig. 15, a sectional view showing the automatic ankle-clamp in side elevation in its open condition; Fig. 16, a similar view of the same in its closed condition; Fig. 17, an enlarged sectional view of the same in its open condition; Fig. 18, a view in elevation of a broken section of a stall-frame carrying a dog and a ratchet on the end of a girth-roller, and Fig. 19 a perspective view of the dog-carrying handle for turning the girth-roller.

A is one of the pair of frames hereinbefore mentioned as forming the confining-stall for the horse to be shod. While this frame may involve any of various constructions suitable for my purpose, I prefer to form it, as shown, of a lower bar $a$, having fastened to its outer end one end of an inclined bar $a'$, with two vertical brace-bars $a^2$ and $a^3$ extending at suitable intervals between them and affording bearings for the roller of a girth-band, hereinafter described. At their inner ends the bars $a$ and $a'$ are so hinged to the wall of the inclosure in which the shoeing work is to be performed that the frames may be swung laterally outward to lie against the wall and out of the way when not in use and in the opposite direction to flank the animal to be shod and form a species of stall.

In suitable positions near the opposite ends of each bar $a$, flatwise on its outer side, are firmly and permanently fastened metal plates B for supporting the adjusting mechanism, hereinafter described. All these supporting-plates are alike, each being provided in a position adjacent to the position of a different leg of the animal, so that the adjusting mechanism may be transferred from one to the other to adapt it to be used on each leg or on any leg desired without moving the horse from the one position illustrated. As shown, the plate B is an angular casting provided on one side at its opposite ends with eyes $b\ b'$, forming bearings in horizontal alinement with each other, for a purpose hereinafter described, the bearings projecting at right angles to the surface of the plate, and formed with the plate, near one end thereof, is a segmental rack $c$, extending crosswise of its upper edge, which is turned to a right angle to extend, for firmness, part way over the top of the lower frame-bar.

C is an angular metal bearing-plate for the adjusting mechanism, involving the shape illustrated or any other suitable shape. On one side, near the opposite ends of its lower edge, the bearing-plate has formed upon it bosses $b^2\ b^3$, terminating at corresponding ends in trunnions $b^4\ b^5$, adapted, respectively, to enter the bearings $b\ b'$ on either plate B, and between which trunnions is pivoted a stop-lever $d$, normally resting at its free headed end upon a lug $d'$ on the bearing-plate to prevent accidental displacement of the plate by withdrawal of the trunnions from their bearings. On the upper horizontal portion of the plate C is formed to extend lengthwise thereof a housing $e$, Figs. 5, 13, and 14, for a plunger-bolt $e'$, surrounded by a spiral spring $e^2$, confined in the housing, the bolt extending in the plane of the rack $c$ to engage at its forward end with the teeth thereof. A bent handle $e^3$ for operating this bolt engages at one end with it through a slot $e^4$ in the bottom of the housing $e$ and is provided at its opposite end, where it is supported on a guide-lug $e^5$, Fig. 5, with a shoulder $e^6$ to be engaged by a pivotal dog $e^7$, having a handle $e^8$, turning of which in one direction withdraws the bolt from engagement with the rack $c$ to reëngage therewith on releasing the dog under the recoil force of the spring $e^2$, all for a purpose hereinafter described.

On the opposite outer surface of the bearing-plate C is formed a guide $f'$ for a sliding bolt $f$, terminating at its forward end, by preference as shown, in a plurality of teeth $f^2$, Fig. 4, and having a shoulder $f^3$ in its upper edge to be engaged for retracting it by a pivotal dog $f^4$ on the end of a handle $f^5$. On the lower side of the guide $f'$ is formed a socket $f^6$ (like that clearly shown at $l^7$ in Fig. 7) for the key D (shown in Fig. 10) and comprising a circumferentially-toothed barrel $g$ on a crank-rod $g'$, the longer bent end of which affords the operating-handle and the opposite end, which projects in advance of the barrel, a trunnion $g^2$. The socket $f^6$ is shaped to conform at its innermost portion to the trunnion $g^2$, and the barrel fits rotatably in the outer portion of the socket, adjacent to which on the guide $f'$ is formed a housing $h$ for a plunger-bolt $h'$, affording a stop for the key D when adjusted, as hereinafter described, the plunger-bolt being spring-pressed, like that shown at $i$ in Fig. 7, and otherwise formed like the latter, the spring being coiled about the bolt within the housing in which it is confined.

E is a segmental rack pivotally fastened, as shown, to the plate C at an opening $k$ therein to be engaged by the teeth on the end of the bolt $f$. At the opposite ends of the straight-edge portion of the rack E it has formed upon it the rigid alining guide-collars $l$ and $l'$. The collar $l$ has a bifurcated extension in the form of a housing $l^2$ for a plunger-bolt $l^3$, like the shouldered bolt $f$ shown in Fig. 5, and adapted, like the latter, to be retracted through the medium of a pivotal dog $l^4$, engaging with its shoulder and provided with an operating-handle $l^5$. The collar $l'$ has an extension $l^6$, containing a key-socket $l^7$, Fig. 7, like the key-socket $f^6$ shown in Fig. 4, adjacent to which is a housing $i'$ on the collar confining the stop-bolt $i$ for the key D, against which is confined in its housing a spiral spring $i^2$, as clearly shown in Fig. 7, tending to shoot the bolt.

F is a rack, preferably in the form of a cylindrical hollow metal bar or pipe $m$, having rigidly fastened lengthwise to its outer surface a rack-bar $m'$. The rack is reciprocably confined in the collars $l\ l'$, which afford bearings for it, and is supported by engagement with its teeth of those on the end of the bolt $l^3$, which is normally projected into such engagement by the force of a coiled spring $s$, confined against it in its housing $l^2$, as clearly shown in Fig. 9. The bolt $f$, Fig. 11, is similarly spring-pressed, though its controlling-spring is not presented to view. The pipe $m$ is flattened at its lower end and has pivotally fastened to it, as clearly shown in Fig. 17, the automatic ankle-clamp G, the general construction of which is like that shown and described in my aforesaid patent. The clamp, as shown, comprises the following construction: A substantially rectangular box $n$ carries at one end a rigid curved arm $o$, provided with ratchet-teeth $v$ on its inner face toward its outer end. A trip-arm $n'$ is pivoted near one end to the box near its open end and carries a stop-finger $n^2$ on the extremity of its shorter end to extend at a right angle thereto beyond the box. A clamp-arm $o'$ is journaled in the box on the same pivot-pin $t$ that carries the trip-arm $n'$ and has a cam-like enlargement $o^2$, affording a stop-shoulder $o^3$, and across which the stop-finger $n^2$ extends. The shoulder $o^3$, with the arm $o'$ in its open condition, as shown in Figs. 15 and 17, abuts against the adjacent end of the box to stop the arm against being turned unduly far in opening. On the inner end of the clamp-arm $o'$ about its pivotal support are formed a number of teeth $r$. This inner end of the clamp-arm is expanded to the width between the inner sides of the box $n$, which guide it in its movements, and the teeth extend across the widened inner end of the arm. Toward its outer end the arm $o'$ is thickened and provided with a transverse opening $o^4$, behind which is formed a chamber $o^5$, in which is confined against a spring $o^6$ a dog $o^7$, having a handle $o^8$, which protrudes through a longitudinal slot $o^9$ in the top of the chamber $o^5$. In the chamber $n$ is reciprocably supported a rod $p$, enlarged by thickening and widening toward its inner end, where it abuts against the adjacent rounded end of the clamp-arm $o'$, normally at a point off a dead-center with the pivot. The enlarged end of the rod $p$ is rectangular and of the width to fit between and be guided in its movements by the sides of the box $n$, and it is provided with a number of teeth $r'$, and a spring $p'$ is confined in the chamber against the enlarged part or head of the rod and about the rear stem portion to lend to the rod a tendency to shoot forward.

The operation is as follows: A horse to be shod is tied in proper position, as represented in Fig. 1, and the frames A are swung to extend along the opposite sides of the animal, when a breech-rope $q$, one end of which should be permanently fastened to the lower bar of the frame A, (not presented to view,) is stretched across to the opposite frame and may be fastened at its free end by a suitable cam clamp device $q'$, provided as a fixture in proper position on the bar $a$. A rope $q^2$, like the rope $q$, should be similarly provided to extend from the lower bar of one frame A across the breast of the animal to the corresponding bar of the other frame, where its free end may be fastened by a cam clamp device $q^3$ like the device $q'$. Thus the animal will be confined at both ends as well as at both sides. If desired, a girth-band may be provided to extend underneath the body of the horse to support part of the weight on the frames, and thereby take so much of the weight off the animal's feet; but when a girth is used for that purpose the frames should be braced from the floor at their outer ends, though no means for the purpose are shown, as they would present no novelty, being commonly provided in connection with similar or analogous frames for the same purpose as those employed in connection with my improved apparatus. A girth-band is shown at H in Fig. 1, being permanently fastened at one end to the lower bar of the frame A (not presented to view) and having its opposite end secured to a tubular roller H', suitably journaled at its opposite ends in the brace-bars $a^2$ and $a^3$ of a frame A and carrying on one end, where it protrudes beyond its journal-bearing, a ratchet-wheel I, held by a pivotal dog I' on the brace $a^3$ and actuated to turn the roller for winding upon it the girth-band by engagement with the teeth of the ratchet-wheel of a dog K' on a handle K, adapted to be applied to the extremity of the girth-roller. The roller H' is commonly made removable. With the horse arranged in the position described the leg-adjusting mechanism is applied to the plate B adjacent to the hoof of the animal to be operated on, the application being made by raising the stop-dog $d$ on the bearing-plate C, carrying all the mechanism, to remove the dog out of the way of the trunnion $b^4$, so that it and the trunnion $b^5$ may be introduced, respectively, into the bearings $b$ and $b'$ in the respective supporting-plate, when the dog $d$ is lowered to hold the trunnions against accidental withdrawal from their bearings. Thereupon the key D is inserted into the socket $l^7$, after first withdrawing the stop-bolt $i$ to permit the introduction of the key and thereafter allowing the bolt to shoot forward across the outer end of the key-barrel to confine it, and after raising the handle $l^5$ to retract the dog $l^3$ and free the rack F the key D, with its teeth engaging those of the rack-bar $m'$, is turned to lower the rack far enough to bring the open clamp G into the plane of the ankle of the animal's leg requiring to be adjusted. Owing to the taper of the animal's body from where a frame-bar $a$ extends along it to the ankle the rack F, because it normally hangs perpendicularly from the frame-bar, requires to be swung inward to bring the clamp G on its lower end into the plane of the ankle. This adjustment of the mechanism, which is one of the features of my improvement, is permitted by the support of the plate C on its trunnions $b^4$ $b^5$ in the bearing $b$ $b'$ on the plate B, and to effect it the handle $e^6$ is raised to retract the bolt $e'$ from engagement with the rack $c$. Then when the ankle-clamp has been brought into the required position it is locked there by releasing the bolt $e'$ to permit it to shoot into engagement with the rack $c$ under the recoil force of its controlling-spring, which is not shown, but is like that illustrated in Fig. 9 in connection with the bolt $l^3$. The trip-arm $n'$ of the clamp G is thereupon pressed against the ankle, with the effect of surrounding it with the clamp-arm $o$ and turning the companion arm $o'$ to carry it also about the ankle and its opening $o^4$ over the end of the arm $o$ until the clamp closely hugs the ankle, and the dog $o^7$ by engaging the teeth $v$ on the rigid clamp-arm locks the two arms together, holding them in their locked relation until released by withdrawing the dog $o^7$ at its handle $o^8$ from the engagement. In being turned by the pressure against the trip-arm to coöperate with the arm $o$ the arm $o'$ at its inner rounded end forces backward the rod $p$ till it passes the dead-center of the pivot $t$, when the recoil force of the spring $p'$ shoots the rod forward, engaging its teeth $r'$ with the teeth $r$ on the clamp-arm $o'$ and snaps the latter quickly into its locked position of hugging the horse's ankle, the locking effect being enhanced by the engagement with each other of the teeth $r$ and $r'$. When the horse's ankle has been thus connected with the adjusting mechanism, the key D is turned in the socket $l^7$ to raise the rack F, and thereby raise the animal's leg to the position in which it is shown in Fig. 1, or to a higher position, and this straight positive adjustment of the leg through the medium of a rigid reciprocable bar forms another feature of my improvement. After the leg has been thus raised it is held by releasing the bolt $l^3$ to permit it to be shot, under the recoil force of the controlling-spring, into engagement with the rack F'. For the purpose of swinging the horse's leg either backward or forward the key D is removed from the socket $l^7$, and upon retracting to permit such removal, the stop-dog $i$ is inserted after retracting the bolt $h'$ into the socket $f^6$, wherein the teeth $g$ on the key-barrel engage with those on the segmental rack E, and on releasing the stop-dog $h$ to permit its controlling-spring to shoot it across the end of the key-barrel for confining the key in place and unlocking the rack E by turning the handle $f^5$ to retract the bolt $f$ the key may be turned in the desired direction to turn the rack E on its journal accordingly and with it the rack F to swing the animal's leg. When the leg has thus been brought to the desired position, it is firmly held there by locking the segmental rack E through the medium of the bolt $f$, which is released for the purpose to permit it, by the recoil force of its controlling-spring, to be shot into engagement with the rack-teeth. After the work has been performed on one of the horse's hoofs if another requires to be operated on the bearing-plate C, with the mechanism carried by it, may be removed from the position in which it has been used upon lifting the dog $d$ out of the way and unseating the trunnions $b^4$ $b^5$ from their bearings $b$ $b'$ and adjusting the same bearing-plate, with the mechanism on it, upon another supporting-plate B, in which new position the mechanism may be actuated to adjust the adjacent leg of the animal in the manner already described.

While the nature of the mechanism illustrated for the embodiment of my improvements has necessitated a minute description of its details to enable the manner of its use to be clearly understood, I do not wish to be understood as intending to limit my invention to the particular details of construction and combinations of parts shown and described, for they may without departure from the invention be variously modified by those skilled in the art.

What I claim as new, and desire to secure by Letters Patent, is—

1. In a horseshoeing apparatus, the combination with a stall-forming bar, of supporting-plates, and leg-adjusting mechanism adapted to be removably supported on one of said plates and interchangeably adjustable from one supporting-plate to the other, substantially as described.

2. In a horseshoeing apparatus, the combination with a pair of stall-forming bars each hinged at one end to a support to swing laterally, of supporting-plates on each bar in positions to correspond with the four legs of an animal placed between said bars, and leg-adjusting mechanism adapted to be removably supported on one of said plates and interchangeably adjustable from one to the other of said supporting-plates, substantially as described.

3. In a horseshoeing apparatus, the combination with a support, of a rigid bar provided at one end with means for connecting it with the animal's leg and confined on said support to be reciprocated longitudinally for adjusting it to raise and lower the leg, substantially as described.

4. In a horseshoeing apparatus, the combination of a supporting-plate, a bearing-plate journaled on said supporting-plate to adapt it to be turned on its journals, and a rigid bar provided at one end with means for connecting it with the animal's leg and supported on said bearing-plate to be reciprocated longitudinally for adjusting it to raise and lower the leg, substantially as described.

5. In a horseshoeing apparatus, the combination of a supporting-plate, and a rigid bar provided at one end with means for connecting it with the animal's leg and journaled between its ends on its support on said plate to adapt it to be turned, and confined in bearings to adapt it to be reciprocated longitudinally for adjusting it to position the leg, substantially as described.

6. In a horseshoeing apparatus, the combination of a supporting-plate, a bearing-plate journaled on said supporting-plate to adapt it to be turned on its journals, and a rigid bar provided at one end with means for connecting it with the animal's leg and journaled between its ends on said bearing-plate to adapt it to be turned, and confined in bearings to adapt it to be reciprocated longitudinally for adjusting it to position the leg, substantially as described.

7. In a horseshoeing apparatus, the combination with a support, of a rack provided at one end with means for connecting it with the animal's leg and confined on said support to be reciprocated longitudinally for adjusting it to raise and lower the leg, means for locking the rack in its adjusted position, and means for raising and lowering it, substantially as described.

8. In a horseshoeing apparatus, the combination of a supporting-plate carrying a segmental rack, a bearing-plate journaled on said supporting-plate and carrying a spring-pressed bolt to engage said rack, a rack provided at one end with means for connecting it with the animal's leg and confined on said bearing-plate in bearings to adapt it to be reciprocated longitudinally for adjusting it to raise and lower the leg, a spring-pressed bolt for locking said reciprocable rack in its adjusted position, and a means for raising and lowering said reciprocable rack, substantially as described.

9. In a horseshoeing apparatus, the combination of a supporting-plate carrying a segmental rack, a bearing-plate journaled on said supporting-plate and carrying a spring-pressed bolt to engage said rack, a rack provided at one end with means for connecting it with the animal's leg and confined on said bearing-plate in bearings to adapt it to be reciprocated longitudinally for adjusting it to raise and lower the leg, a spring-pressed bolt for locking said reciprocable rack in its adjusted position, a key-socket open to said reciprocable rack, and a key for insertion into said socket to be turned therein in engagement with said reciprocable rack to raise and lower it, substantially as described.

10. In a horseshoeing apparatus, the combination of a supporting-plate, a bearing-plate journaled on said supporting-plate, a segmental rack journaled on said bearing-plate and carrying collars, a spring-pressed bolt for engaging with said rack to lock it, a key-socket open to said rack, a key for insertion into said socket to be turned therein in engagement with said rack to rotate it on its journal, a rack confined in said collars and longitudinally reciprocable therein, a spring-pressed bolt for locking said reciprocable rack, and a key-socket open to said reciprocable rack to receive a key rotatable in the socket and adapted to engage with said reciprocable rack for raising and lowering it, substantially as described.

11. In a horseshoeing apparatus, the combination with stall-forming frames each hinged at one end to a support to swing laterally, of supporting-plates secured to said frames, each provided with horizontally-alining journal-bearings on its outer face and with a segmental rack, a bearing-plate provided on its inner face with horizontally-alining trunnions to enter said bearings and with a spring-pressed bolt to engage with said rack, a segmental rack journaled on said bearing-plate and carrying vertically-alining collars, a rack-bar confined in said collars to be reciprocated longitudinally and provided on its lower end with means for connecting it with the animal's leg, a spring-pressed bolt supported on said bearing-plate to engage with said journaled segmental rack, a socket adjacent to said journaled segmental rack for receiving a key rotatable therein in engagement with said rack to rotate it, a spring-pressed bolt supported on said bearing-plate to engage with said longitudinally-reciprocable rack, and a socket adjacent to said longitudinally-reciprocable rack for receiving a key rotatable therein in engagement with said rack to move it longitudinally, substantially as described.

12. In a horseshoeing apparatus, an automatic clamp for encircling the animal's ankle, comprising, in combination, a box carrying a rigid, curved arm, a clamp-arm pivoted at one end to said box and adapted to engage toward its opposite end with the free end of said rigid arm, a cam-surface on said pivotal arm adjacent to its pivot, a trip-arm pivoted between its ends on said box and provided at one end with a finger to engage with said cam-surface, and a spring-pressed bar reciprocably confined in said box to bear at one end normally against the inner end of said pivotal cam-arm off a dead-center with its pivot, substantially as and for the purpose set forth.

13. In a horseshoeing apparatus, an automatic clamp for encircling the animal's ankle, comprising, in combination, a box carrying near one end a rigid curved arm provided with ratchet-teeth along its outer end, a clamp-arm pivoted at one end to said box near its opposite end and provided with teeth about the pivot, with a cam-surface opposite the toothed portion, with a stop-shoulder, and with an opening in the outer end to admit the toothed end of said rigid arm, a chamber on the outer end of said pivotal arm containing a spring-pressed bolt, a trip-arm pivoted between its ends on said box and provided at one end with a finger to engage with said cam-surface, and a spring-pressed bar reciprocably confined in said box and having teeth on its inner end at which it bears normally against the adjacent end of said pivotal cam-arm off a dead-center with its pivot, substantially as and for the purpose set forth.

14. In a horseshoeing apparatus, the combination of a rack-bar confined to be reciprocated longitudinally on a support, and an automatic clamp for encircling the animal's ankle journaled on the lower end of said rack-bar, substantially as described.

GEORGE N. BARCUS.

In presence of—
D. W. LEE,
L. HEISLAR.